(12) United States Patent　　(10) Patent No.: US 8,994,935 B2
Kinney　　(45) Date of Patent: Mar. 31, 2015

(54) LASER ALIGNMENT APPARATUS

(71) Applicant: Greg Cunningham Kinney, Ogden, UT (US)

(72) Inventor: Greg Cunningham Kinney, Ogden, UT (US)

( * ) Notice: Subject to any disclaimer, the term of this patent is extended or adjusted under 35 U.S.C. 154(b) by 123 days.

(21) Appl. No.: 13/888,136

(22) Filed: May 6, 2013

(65) Prior Publication Data

US 2013/0293876 A1　　Nov. 7, 2013

Related U.S. Application Data

(60) Provisional application No. 61/643,738, filed on May 7, 2012.

(51) Int. Cl.
*G01B 9/00*　　(2006.01)
*G01B 11/27*　　(2006.01)

(52) U.S. Cl.
CPC . *G01B 9/00* (2013.01); *G01B 11/27* (2013.01)
USPC ........................................................ 356/138

(58) Field of Classification Search
CPC .................................. G01B 9/00; G01B 11/27
USPC ........................................................ 356/138
See application file for complete search history.

(56) References Cited

U.S. PATENT DOCUMENTS

| 5,923,428 | A | * | 7/1999 | Woodworth | 356/623 |
| 5,991,041 | A | * | 11/1999 | Woodworth | 356/602 |
| 6,137,577 | A | * | 10/2000 | Woodworth | 356/623 |
| 6,153,886 | A | * | 11/2000 | Hagiwara et al. | 250/548 |
| 6,177,999 | B1 | * | 1/2001 | Wurz et al. | 356/623 |
| 6,400,451 | B1 | * | 6/2002 | Fukuda et al. | 356/139.09 |
| 7,738,121 | B2 | * | 6/2010 | Spalding | 356/638 |
| 2007/0030486 | A1 | * | 2/2007 | Gelbart | 356/399 |
| 2008/0273211 | A1 | * | 11/2008 | Schmitt et al. | 356/611 |
| 2009/0040532 | A1 | * | 2/2009 | Kawasaki et al. | 356/610 |
| 2009/0103113 | A1 | * | 4/2009 | Nygaard et al. | 356/640 |

* cited by examiner

*Primary Examiner* — Roy M Punnoose (57) ABSTRACT

A laser alignment apparatus includes a central compartment, a plurality of laser modules, a power supply cord, and a ceiling attachment system. Each of the plurality of laser modules is connected around the central compartment through a rod end bearing of the plurality of laser modules, where a bearing ring of the rod end bearing allows users to pivot, rotate, and tilt a laser device of each of the plurality of laser modules. The power supply cord provides the necessary power to the laser device of each of the plurality of laser modules from an external power source. The ceiling attachment system secures the central compartment with the connected plurality of laser modules to an existing ceiling. The laser device of each of the plurality of laser modules can be activated for alignment purpose within a screen printing machine or any other machines that required precise alignments.

15 Claims, 9 Drawing Sheets

LASER ALIGNMENT APPARATUS

The current application claims a priority to the U.S. Provisional Patent application Ser. No. 61/643,738 filed on May 7, 2012.

FIELD OF THE INVENTION

The present invention relates generally to an apparatus for an alignment system. More specifically, the present invention relates to a laser alignment apparatus which is concurrently used with a screen printing machine.

BACKGROUND OF THE INVENTION

There are a number of applications where it is important to obtain precise alignment between two elements or among three or more elements and particularly to quantify any misalignments that may exist. For examples, such alignments are beneficial when aligning two or more machine elements, such as a screen printer on both an automatic screen printing and a manual screen printing machine, embroidery hooping, digital printers, and cap printers. Currently, a person has to manually align all of the fabric to ensure a precise placement so that correct placement can be achieved for the given object. This process takes a lot of time since the manually aligning process includes multiple steps and those multiple steps have to be done for each of the given object. The manually aligning process wastes a lot of man-hours and money that could put to better use elsewhere since the process is inefficient.

It is therefore an object of the present invention to create a laser alignment apparatus, where the present invention is designed for both an automatic and a manual a screen printing machines, embroidery hooping, digital printers, cap printers, and many other applications which required precise placement.

DETAIL DESCRIPTIONS OF THE INVENTION

All illustrations of the drawings are for the purpose of describing selected versions of the present invention and are not intended to limit the scope of the present invention.

The present invention is a laser alignment apparatus that is designed for both automatic and manual screen printing machines, embroidery hooping, digital printers, cap printers and any other application in which precise placement is required. The present invention is hereinafter described with reference to the screen printing machines but can also use with any other related printing machines. The present invention comprises a central compartment 1, a plurality of laser modules 2, a power supply cord 3, and a ceiling attachment system 4. The plurality of laser modules 2 is positioned around the central compartment 1, and the required power for the plurality of laser modules 2 is provided through the power supply cord 3. The ceiling attachment system 4 is able to secure the central compartment 1 and the connected plurality of laser modules 2 with an existing ceiling 5 of a building above the screen printing machine.

Figure 1:
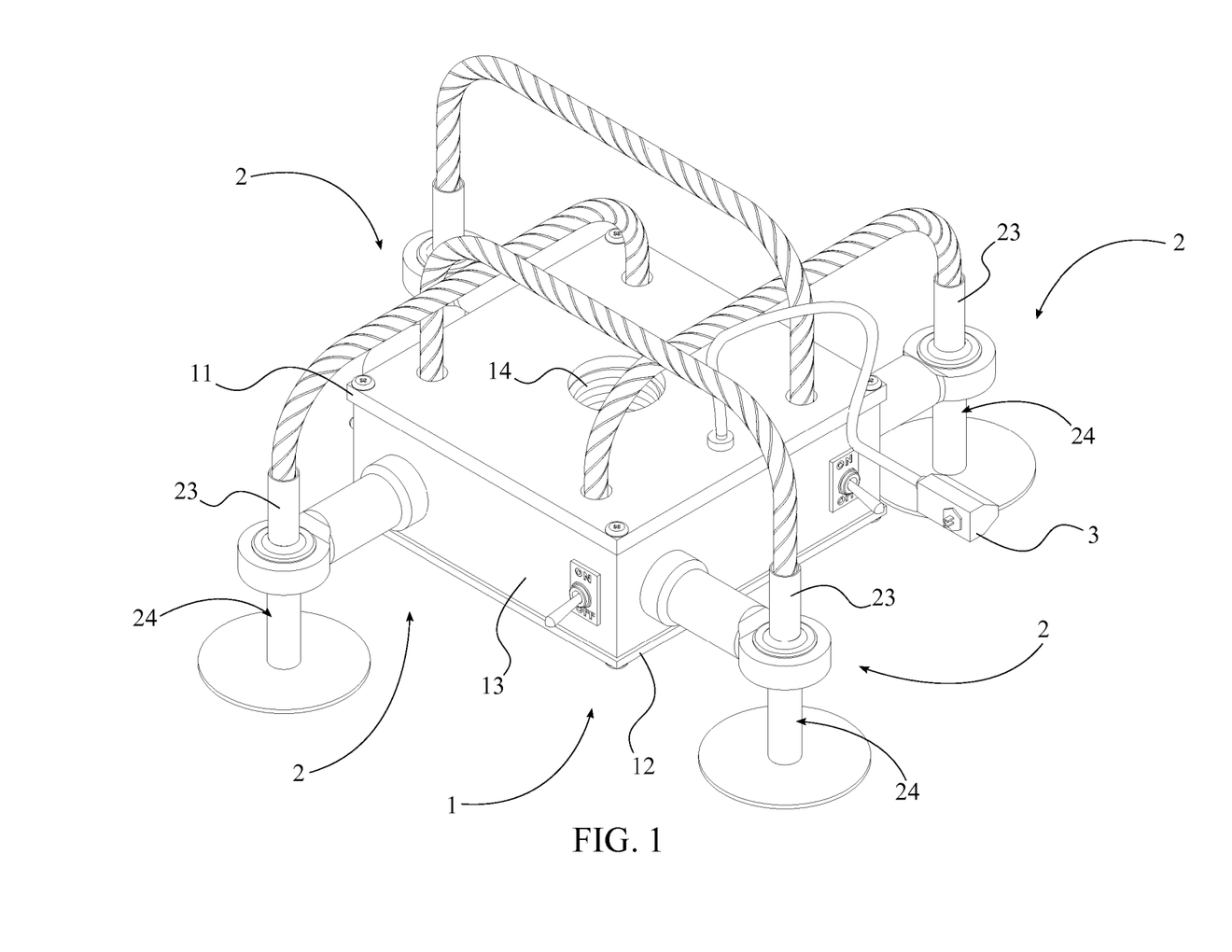
FIG. 1 is a top perspective view of the central compartment, the plurality of laser modules, and the power supply cord of the present invention.
Figure 2:
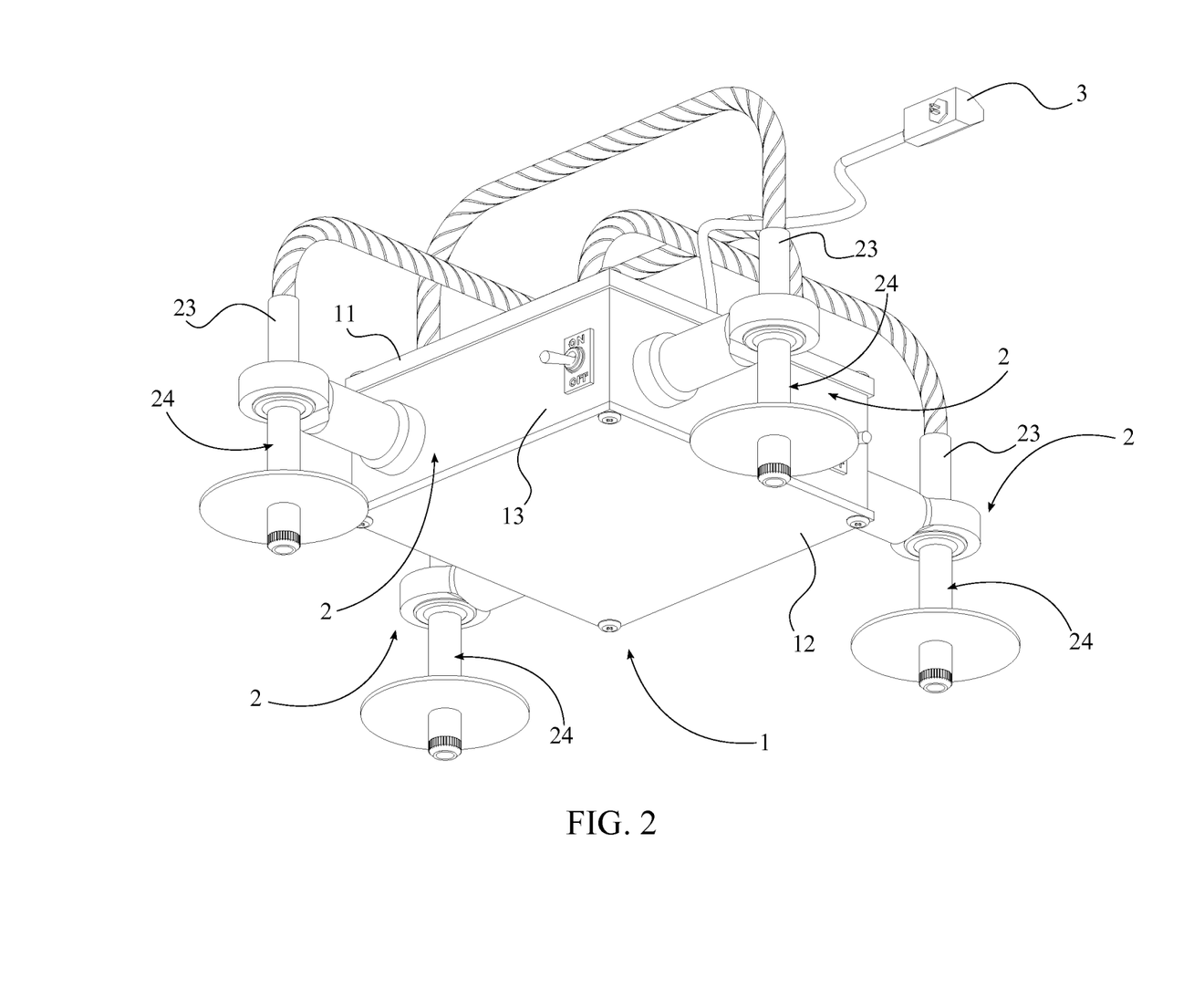
FIG. 2 is a bottom perspective view of the central compartment, the plurality of laser modules, and the power supply cord of the present invention.
Figure 3:
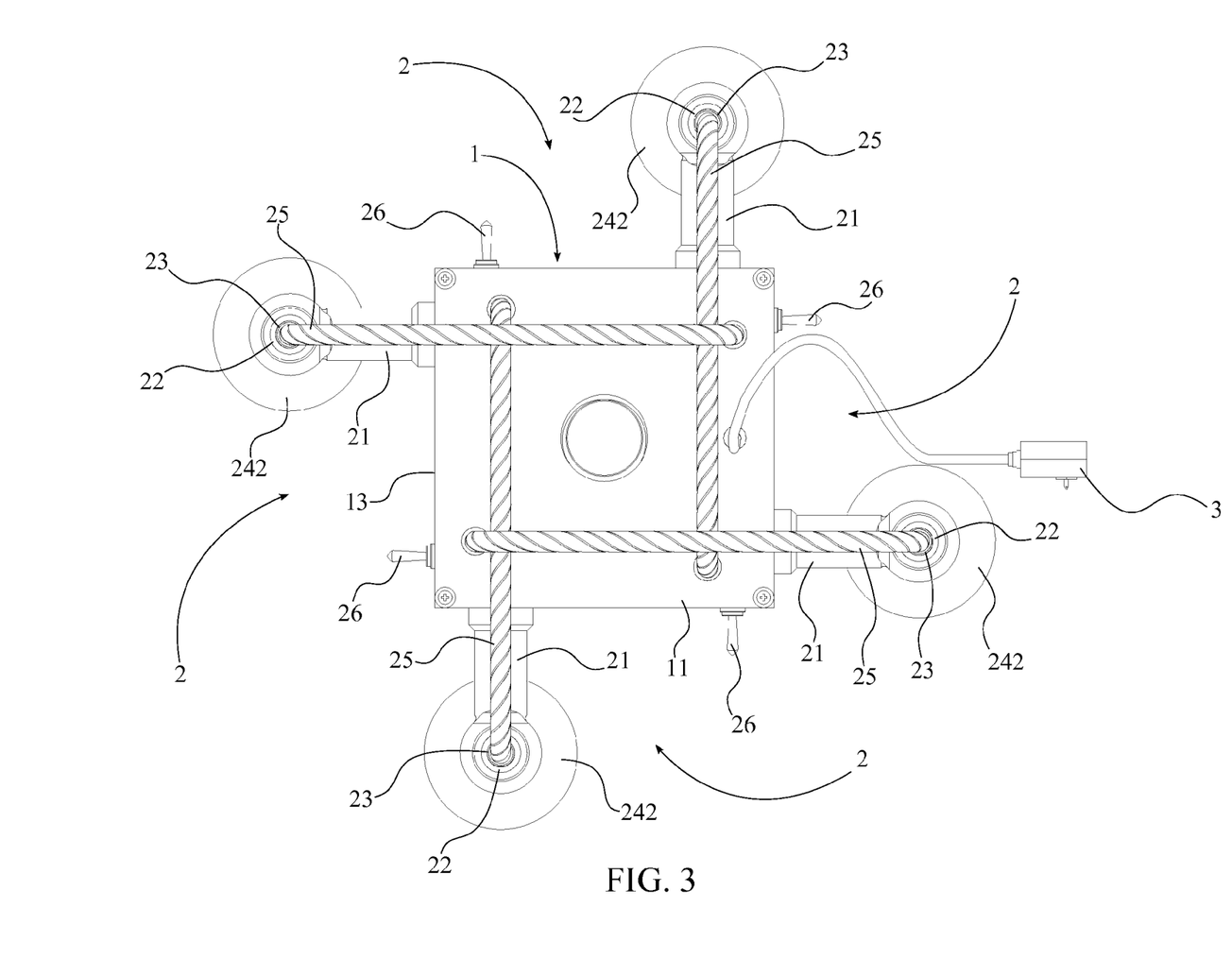
FIG. 3 is a top view of the central compartment, the plurality of laser modules, and the power supply cord of the present invention.
Figure 4:
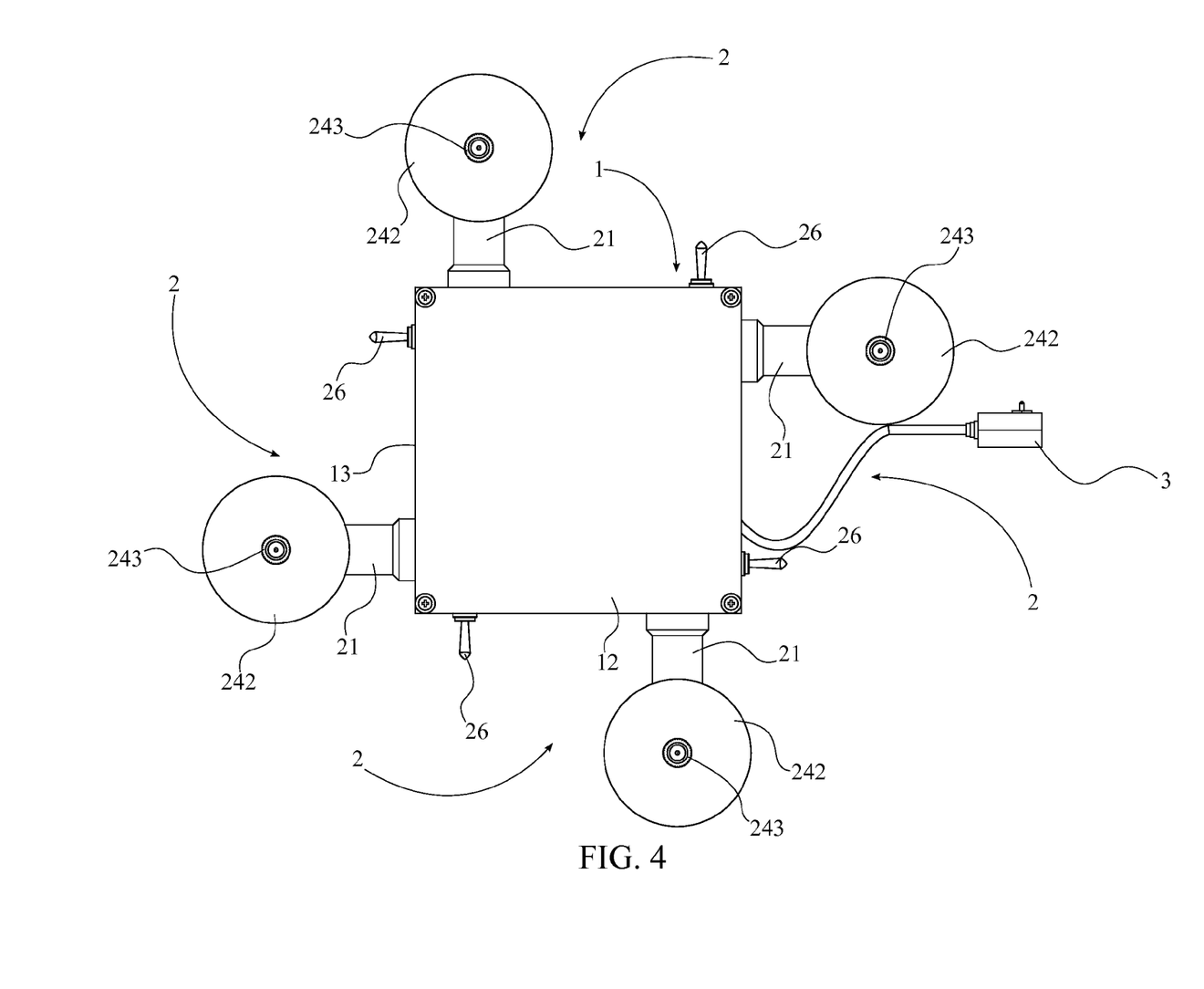
FIG. 4 is a bottom view of the central compartment, the plurality of laser modules, and the power supply cord of the present invention.

In reference to FIG. 1 and FIG. 2, the central compartment 1 provides a foundation so that the rest of the components of the present invention can be attached or connected. The central compartment 1 comprises a top cover 11, a bottom cover 12, and a lateral cover 13. The top cover 11 and the bottom cover 12 are attached to the lateral cover 13, where the top cover 11 and the bottom cover 12 are oppositely positioned across the lateral cover 13. The overall shape of the central compartment 1 is preferably made into a square shape, but is not limited to the square shape and can be any other geometric shapes. In the preferred embodiment of the present invention, the top cover 11 and the bottom cover 12 are attached to the lateral cover 13 with screws. Even though the screws are used within the preferred embodiment, the present invention can use any other type of fasteners such as locking clamps, bolts and nuts, and adhesive materials to attach the top cover 11 and the bottom cover 12 with the lateral cover 13. The central compartment 1 can be made from, but is not limited to, hard plastic, aluminum, ceramic, or any other high strength and light weighted materials. The power supply cord 3, which provides the required power for the plurality of laser modules 2, is extended out from the top cover 11.

In reference to FIG. 3-FIG. 7, each of the plurality of laser modules 2 comprises a rod end bearing 21, a bearing ring 22, a connecting tube 23, a laser device 24, a spiral wire extension 25, and a switch 26. The rod end bearing 21 is permanently connected on the lateral cover 13, where the rod end bearing 21 is perpendicularly positioned with the lateral cover 13. The bearing ring 22 is pivotably positioned within the rod end bearing 21 and oppositely positioned away the lateral cover 13. The rod end bearing 21 provides a stable platform for the bearing ring 22 so that only the bearing ring 22 can pivot in any direction while keeping the rod end bearing 21 stable. The rod end bearing 21 is made with high tolerance measurements allowing the bearing ring 22 to hold its position in any direction after the bearing ring 22 is rotated. The rod end bearing 21 can be made from high strength and durable materials, such as steel and hard plastic, that can withstand constant movements of the bearing ring 22. The connecting tube 23 is permanently connected with the bearing ring 22. More specifically, the connecting tube 23 is traversed through and concentrically positioned within the bearing ring 22. The connecting tube 23 is preferably made from stainless steel, but the connecting tube 23 is not limited to stainless steel and can be any other type of high strength materials.

Figure 6:
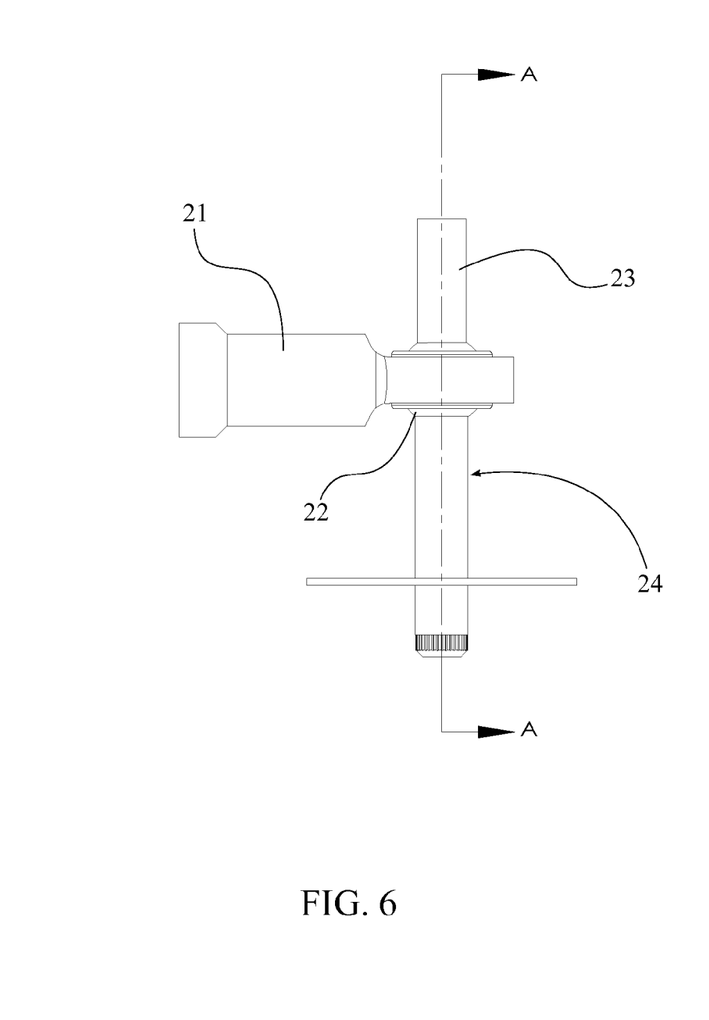
FIG. 6 is a side view of the laser module of the present invention without the switch and the spiral wire extension, showing the plane upon which a cross sectional view is taken shown in FIG. 7.
Figure 7:
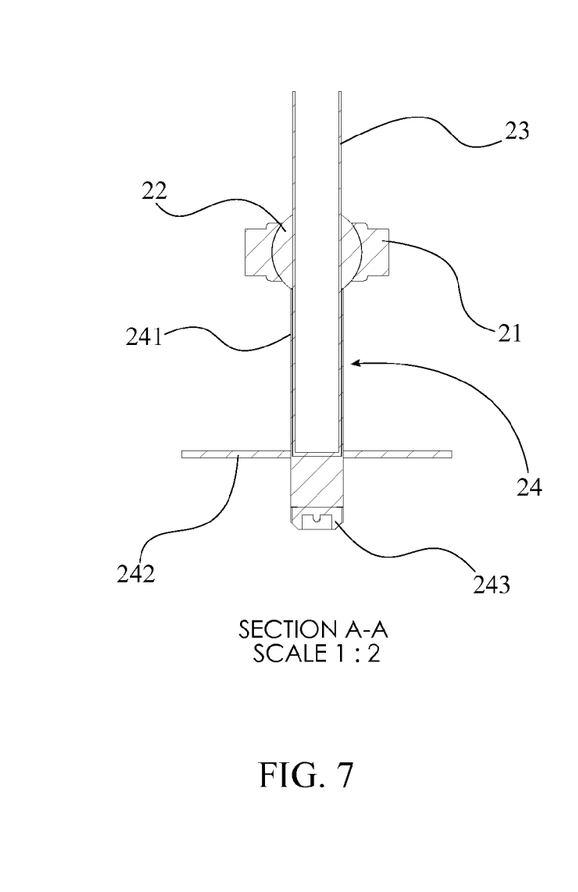
FIG. 7 is a cross section view of the laser module of the present invention without the switch and the spiral wire extension taken along the line A-A of FIG. 6.

As shown in FIG. 6 and FIG. 7, the laser device 24 that comprises a device body 241, an alignment ring 242, and a desired lens 243 is firmly connected with the connecting tube 23. The laser device 24 is concentrically inserted around the connecting tube 23 from bottom, where the laser device 24 is adjacently positioned with the bearing ring 22 and the bottom cover 12. More specifically, the device body 241 of the laser device 24 is concentrically connected around the connecting tube 23 by adhesive materials. The desired lens 243, which can be a crosshair lens, a line lens, or a dot lens, is removably attached to the device body 241 opposite from the bearing ring 22. Since the desired lens 243 is removable, the users of the present invention can interchange different lenses with the laser device 24 for different alignments. For example, the users can use two crosshair lenses as the desired lens 243, where the two crosshair lenses use with two laser devices 24 to create a rectangular outline. If the users need to create only horizontal or vertical lines, the user can use the line lenses with the laser device 24 as the desired lens 243. The alignment ring 242 is positioned around the device body 241, where the alignment ring 242 adjacently positions with the desired lens 243. The alignment ring 242 provides a surface for the users of the present invention so that the users can interchange the desired lens 243 and pivot the laser device 24 in any direction by holding onto the alignment ring 242.

Figure 5:
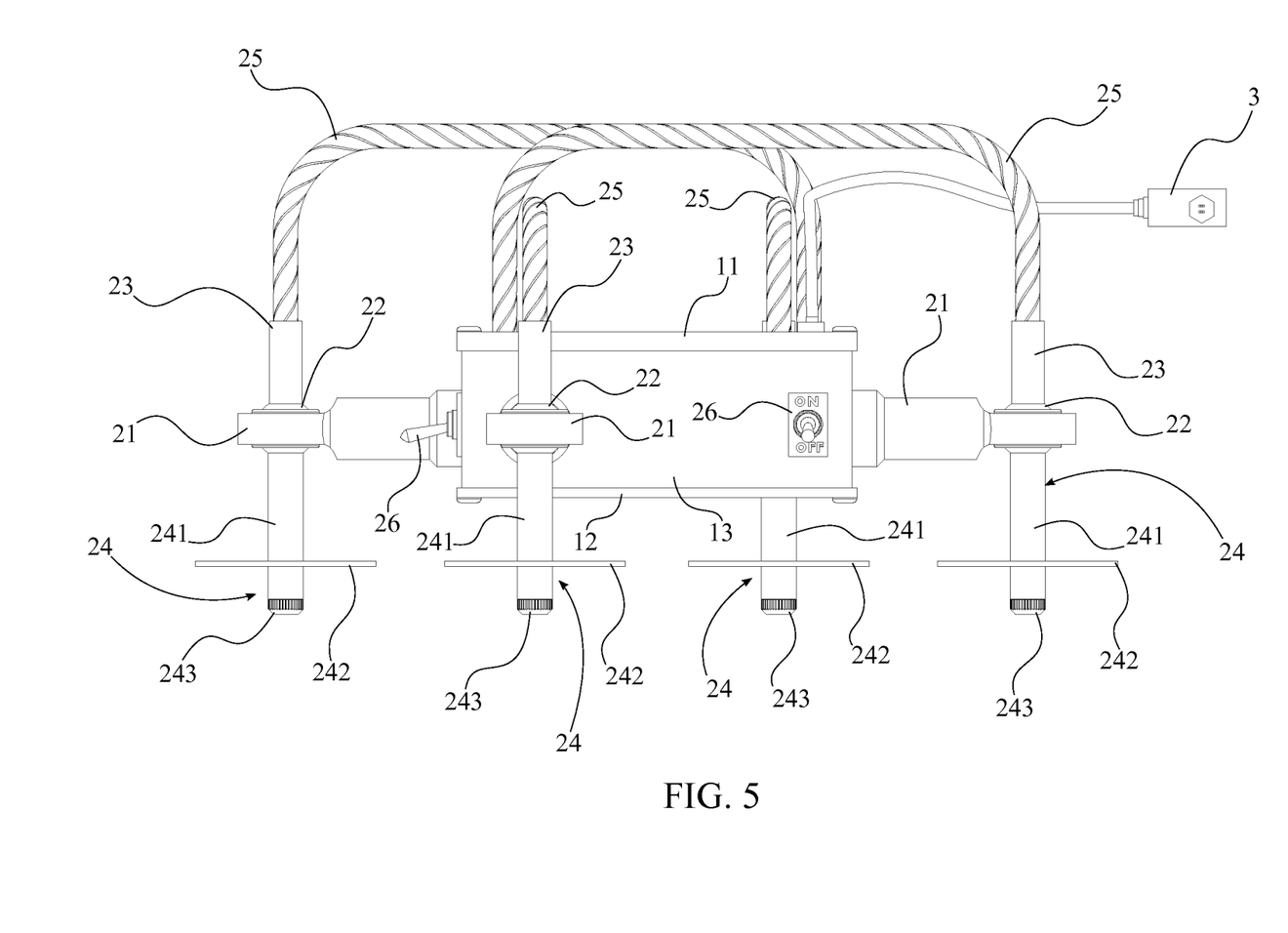
FIG. 5 is a front view of the central compartment, the plurality of laser modules, and the power supply cord of the present invention.

In reference to FIG. 5, the spiral wire extension 25 is extended from the connecting tube 23 to the central compartment 1. More specifically, the spiral wire extension 25 is positioned within the connecting tube 23 and connected with the device body 241 from one end, and the opposite end of the spiral wire extension 25 traverses into the central compartment 1. Since a section of the spiral wire extension 25 is positioned within the connecting tube 23, the connection between the device body 241 and the spiral wire extension 25 is able to withstand the constant movement of the laser device 24 and the connecting tube 23 while protecting the connection point. The spiral wire extension 25 is enclosed with flexible and nonconductive material to improve the reliably and the safety of the present invention. The switch 26 is positioned on the lateral cover 13, where the switch 26 is adjacently positioned with the laser device 24.

Figure 10:
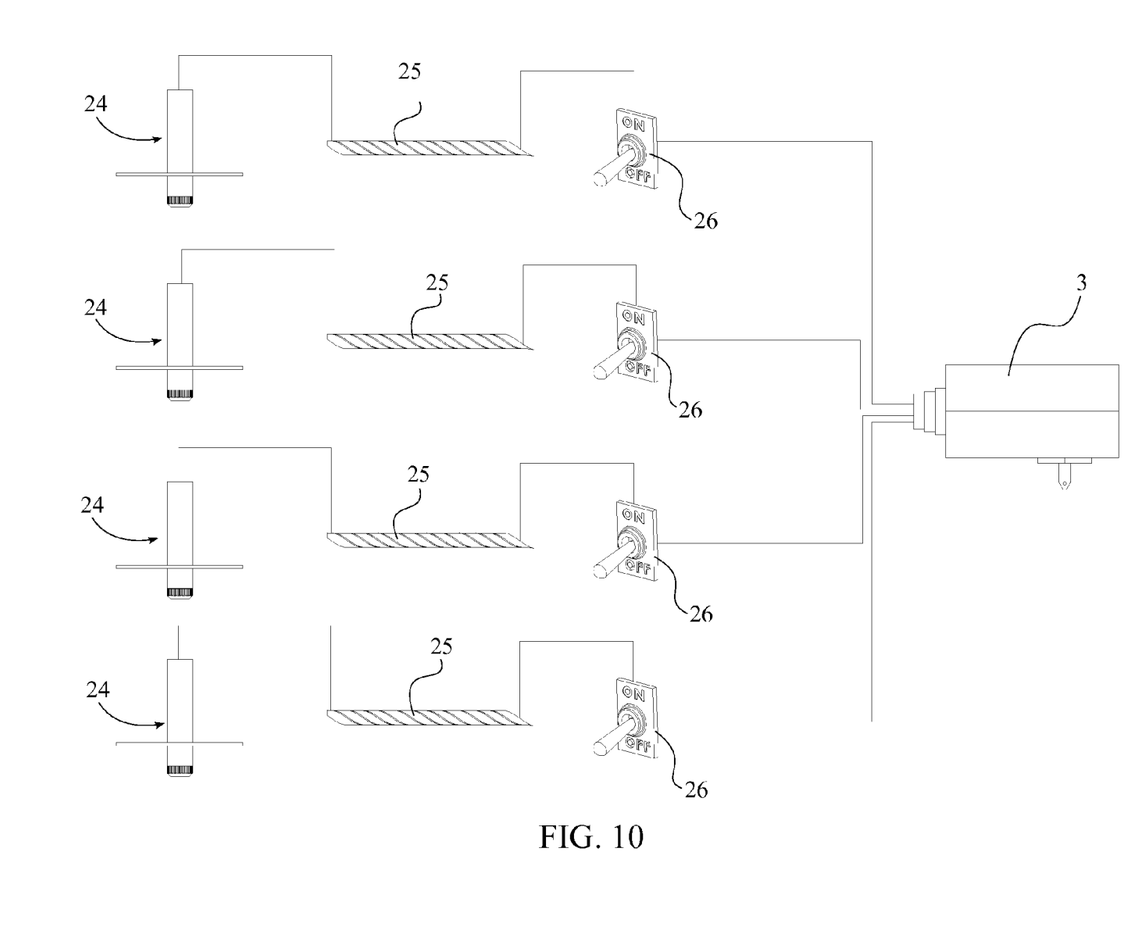
FIG. 10 is a flow chart illustrating the electrical connections of the present invention.

In reference to FIG. 10, the laser device 24 is electrically connected with the spiral wire extension 25 within the device body 241. The spiral wire extension 25 is also electrically connected with the switch 26 within the central compartment 1. More specifically, the laser device 24 for each of the plurality of laser modules 2 is electrically connected with the respective switch 26 of each of the plurality of laser modules 2 through the respective spiral wire extension 25 of each of the plurality of laser modules 2. The switch 26 for each of the plurality of laser modules 2 is electrically connected with the power supply cord 3 within the central compartment 1. When the power supply cord 3 is electrically connected with an external electrical outlet, the power supply cord 3, which also has an embedded inverter, converts alternating current into direct current and supplies the required current to the laser device 24. In an alternative embodiment of the present invention, the power supply cord 3 may comprise a separate inverter that electrically connects in between the switch 26 of each of the plurality of laser modules 2 and the power supply cord 3 within the central compartment 1. Since the switch 26 is electrically connected in between the power supply cord 3 and the laser device 24, the switch 26 is able activate and deactivate the laser device 24 upon user's command. Given that each of the plurality of laser modules 2 is individually and electrically connected with the power supply cord 3, the laser device 24 of each of the plurality of laser modules 2 can be individually activated or deactivate by the switch 26 of each of the plurality of laser modules 2. The laser device 24 used within the present invention has a life span of 5000 hours or more, where the extended life span of the laser device 24 creates a dependable system.

Figure 8:
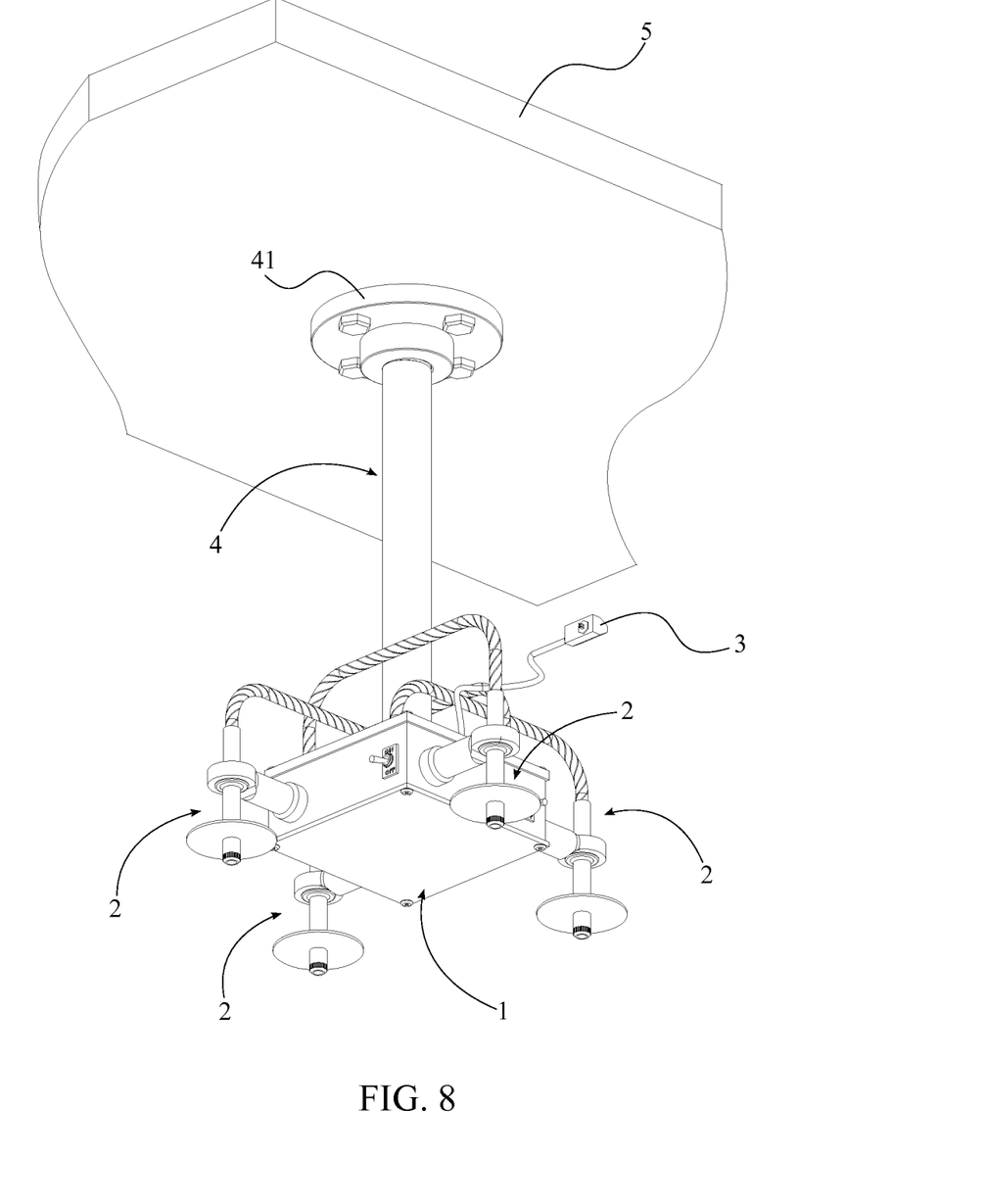
FIG. 8 is a perspective view of the present invention, wherein the present invention secured with an existing ceiling.
Figure 9:
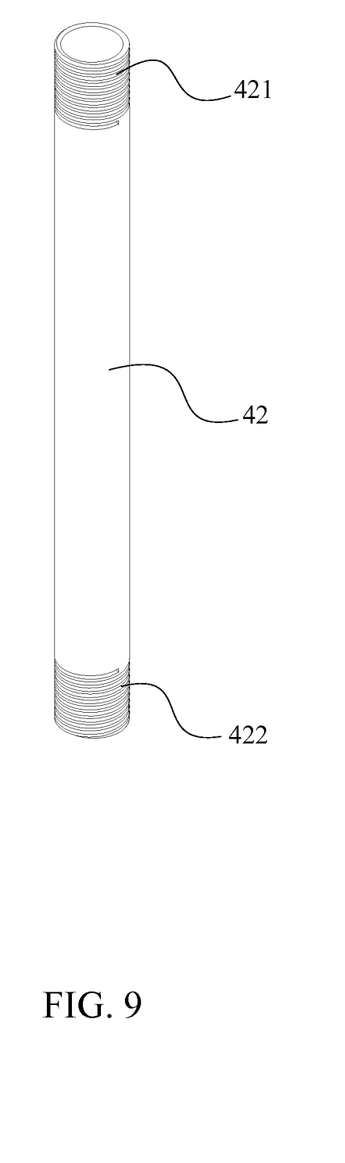
FIG. 9 is a perspective view of the connecting pipe of the ceiling attachment system of the present invention.

In reference to FIG. 8 and FIG. 9, the ceiling attachment system 4 removably mounts the central compartment 1 to the existing ceiling 5 of the building, where the ceiling attachment system 4 comprises a connecting pipe 42 and a treaded ceiling flange 41. The central compartment 1 is mounted directly above where the users intend to use the plurality of laser modules 2. The treaded ceiling flange 41 is firmly connected with the existing ceiling 5 by a plurality of connectors such as nuts and bolts, U-bolts, and screws. The proper plurality of connectors has to be selected according to the constructed materials of the existing ceiling 5 since the existing ceiling 5 can be, but not limited to concrete, wood, drywall, and metal tubing. The connecting pipe 42 is removably engaged with the treaded ceiling flange 41 through a first treaded end 421. The connecting pipe 42 is also removably engaged with the central compartment 1 opposite from the treaded ceiling flange 41. More specifically, a second treaded end 422 of the connecting pipe 42 is removably engaged with a treaded attachment cavity 14 of the top cover 11, where the treaded attachment cavity 14 being concentrically positioned on the top cover 11. The connecting pipe 42 determines the comfortable height for the users of the present invention from the ground level. Preferably, the present invention is placed within the arms reach of the users and above the head of the users so that the users can comfortably operate the plurality of laser modules 2 without bumping their heads into the central compartment 1 or the plurality of laser modules 2. The connecting pipe 42 can be, but not limited to a black pipe, galvanized pipe, and plastic pipe. Additional stabilizing components, such as tension wires and brackets, may also use alongside with the ceiling attachment in order to achieve additional stability for the present invention.

The top cover 11 can also comprise a switched magnetic base that can mount the present invention with magnetically attractive surfaces. The switched magnetic base enables the present invention to be portable so that the present invention can be mounted in different locations with a simple magnetic locking system. The magnetic power, which is created by electrical current and activated by an on/off switch, secures the present invention in the different locations as long as the different locations include the magnetically attractive surface.

Once the laser devices 24 are activated, the user of the present invention can tilt, pivot, and rotate the laser devices 24 along with the connecting tubes 23. The rod end bearings 21 allow complete 360 degrees motion to the laser devices 24 so that the user can precisely align the laser beams on the printing platforms of the screen printing machine as the present invention is mounted directly above a work station platform of the printing platforms. The user of the present invention can interchange the desired lens 243 and moves around the laser device 24 within the rod end bearing 21 so that desired dimensions and outlines can be obtained for the proper alignments of the selected graphics. For example, user can create a rectangular outline, multiple rectangular outlines, vertical and horizontal lines, plurality of dots, rotated right angle lines, and many other geometric shapes. Once the proper alignments are completed, the user of the screen printing machine can continuously and efficiently operates the screen printing machine while printing selected graphics on the garments with reference to the work station platform and the alignments provided from the laser devices 24. Due to that fact that the alignments of the selected graphics stay constant for all of the printed garments, the garments can be precisely finished with the selected graphics without any errors or mishaps. Since the setup time for the screen printing process is much shorter with the present invention compare to the traditional screen printing setup time, the efficient process of the present invention saves time and money the employer. The present invention can also be used to align the printing platforms of the screen printing machine before the screen printing process.

Although the invention has been explained in relation to its preferred embodiment, it is to be understood that many other possible modifications and variations can be made without departing from the spirit and scope of the invention as hereinafter claimed.

What is claimed is:

1. A laser alignment apparatus comprises:
   a central compartment;
   a plurality of laser modules;
   a power supply cord;
   a ceiling attachment system;
   the central compartment comprises a top cover, a bottom cover, and a lateral cover;
   each of the plurality of laser modules comprises a rod end bearing, a bearing ring, a connecting tube, a laser device, a spiral wire extension, and a switch;
   the laser device comprises a device body, an alignment ring, and a pre-selected lens;
   the plurality of laser modules being positioned around the central compartment;
   the top cover and the bottom cover being attached to the lateral cover;
   the top cover and the bottom cover being oppositely positioned across the lateral cover;
   the power supply cord being extended out from the top cover;
   the laser device being electrically connected with the spiral wire extension within the device body;
   the spiral wire extension being electrically connected with the switch within the central compartment; and
   the switch for each of the plurality of laser modules being electrically connected with the power supply cord within the central compartment.

2. The laser alignment apparatus as claimed in claim 1 comprises:
   the rod end bearing being permanently connected on the lateral cover;
   the rod end bearing being perpendicularly positioned with the lateral cover;
   the bearing ring being pivotably positioned within the rod end bearing opposite from the lateral cover;
   the connecting tube being permanently connected with the bearing ring;
   the connecting tube is traversed through the bearing ring;
   the connecting tube being concentrically positioned within the bearing ring;
   the laser device being firmly connected with the connecting tube;
   the laser device being concentrically inserted around the connecting tube;
   the laser device being adjacently positioned with the bearing ring and the bottom cover;
   the spiral wire extension being extended from the connecting tube to the central compartment;
   the spiral wire extension being positioned within the connecting tube;
   the spiral wire extension is traversed into the central compartment; and
   the switch being positioned on the lateral cover.

3. The laser alignment apparatus as claimed in claim 2 comprises:
   the device body being concentrically connected around the connecting tube;
   the pre-selected lens being removably attached to the device body opposite from the bearing ring;
   the alignment ring being positioned around the device body; and
   the alignment ring being adjacently positioned with the desired lens.

4. The laser alignment apparatus as claimed in claim 2 comprises:
   the switch being adjacently positioned with the laser device.

5. The laser alignment apparatus as claimed in claim 1 comprises:
   the central compartment being removably attached with the ceiling attachment system, wherein the ceiling attachment system is connected with an existing ceiling.

6. The laser alignment apparatus as claimed in claim 5 comprises:
   the top cover comprises a treaded attachment cavity;
   the treaded attachment cavity being concentrically positioned on the top cover;
   the ceiling attachment system comprises a connecting pipe and a treaded ceiling flange;
   the treaded ceiling flange being firmly connected with the existing ceiling;
   the connecting pipe being removably engaged with the treaded ceiling flange through a first treaded end of the connecting pipe; and
   the treaded attachment cavity being removably engaged with the connecting pipe through a second treaded end of the connecting pipe.

7. A laser alignment apparatus comprises:
   a central compartment;
   a plurality of laser modules;
   a power supply cord;
   a ceiling attachment system;
   the central compartment comprises a top cover, a bottom cover, and a lateral cover;
   each of the plurality of laser modules comprises a rod end bearing, a bearing ring, a connecting tube, a laser device, a spiral wire extension, and a switch;
   the laser device comprises a device body, an alignment ring, and a pre-selected lens;
   the top cover and the bottom cover being attached to the lateral cover;
   the top cover and the bottom cover being oppositely positioned across the lateral cover;
   the power supply cord being extended out from the top cover;
   the plurality of laser modules being positioned around the central compartment; and
   the central compartment being removably attached with the ceiling attachment system, wherein the ceiling attachment system is connected with an existing ceiling.

8. The laser alignment apparatus as claimed in claim 7 comprises:
   the rod end bearing being permanently connected on the lateral cover;

the rod end bearing being perpendicularly positioned with the lateral cover;
the bearing ring being pivotably positioned within the rod end bearing opposite from the lateral cover;
the connecting tube being permanently connected with the bearing ring;
the connecting tube is traversed through the bearing ring;
the connecting tube being concentrically positioned within the bearing ring;
the laser device being firmly connected with the connecting tube;
the laser device being concentrically inserted around the connecting tube;
the laser device being adjacently positioned with the bearing ring and the bottom cover;
the spiral wire extension being extended from the connecting tube to the central compartment;
the spiral wire extension being positioned within the connecting tube;
the spiral wire extension is traversed into the central compartment; and
the switch being positioned on the lateral cover.

9. The laser alignment apparatus as claimed in claim 8 comprises:
the device body being concentrically connected around the connecting tube;
the pre-selected lens being removably attached to the device body opposite from the bearing ring;
the alignment ring being positioned around the device body; and
the alignment ring being adjacently positioned with the desired lens.

10. The laser alignment apparatus as claimed in claim 8 comprises:
the switch being adjacently positioned with the laser device.

11. The laser alignment apparatus as claimed in claim 7 comprises:
the laser device being electrically connected with the spiral wire extension within the device body;
the spiral wire extension being electrically connected with the switch within the central compartment; and
the switch for each of the plurality of laser modules being electrically connected with the power supply cord within the central compartment.

12. The laser alignment apparatus as claimed in claim 7 comprises:
the top cover comprises a treaded attachment cavity;
the treaded attachment cavity being concentrically positioned on the top cover;
the ceiling attachment system comprises a connecting pipe and a treaded ceiling flange;
the treaded ceiling flange being firmly connected with the existing ceiling;
the connecting pipe being removably engaged with the treaded ceiling flange through a first treaded end of the connecting pipe; and
the treaded attachment cavity being removably engaged with the connecting pipe through a second treaded end of the connecting pipe.

13. A laser alignment apparatus comprises:
a central compartment;
a plurality of laser modules;
a power supply cord;
a ceiling attachment system;
the central compartment comprises a top cover, a bottom cover, and a lateral cover;
each of the plurality of laser modules comprises a rod end bearing, a bearing ring, a connecting tube, a laser device, a spiral wire extension, and a switch;
the laser device comprises a device body, an alignment ring, and a pre-selected lens;
the top cover and the bottom cover being attached to the lateral cover;
the top cover and the bottom cover being oppositely positioned across the lateral cover;
the power supply cord being extended out from the top cover;
the rod end bearing being permanently connected on the lateral cover;
the rod end bearing being perpendicularly positioned with the lateral cover;
the bearing ring being pivotably positioned within the rod end bearing opposite from the lateral cover;
the connecting tube being permanently connected with the bearing ring;
the connecting tube is traversed through the bearing ring;
the connecting tube being concentrically positioned within the bearing ring;
the laser device being firmly connected with the connecting tube;
the laser device being concentrically inserted around the connecting tube;
the laser device being adjacently positioned with the bearing ring and the bottom cover;
the spiral wire extension being extended from the connecting tube to the central compartment;
the spiral wire extension being positioned within the connecting tube;
the spiral wire extension is traversed into the central compartment;
the switch being positioned on the lateral cover;
the laser device being electrically connected with the spiral wire extension within the device body;
the spiral wire extension being electrically connected with the switch within the central compartment;
the switch for each of the plurality of laser modules being electrically connected with the power supply cord within the central compartment;
the central compartment being removably attached with the ceiling attachment system, wherein the ceiling attachment system is connected with an existing ceiling;
the top cover comprises a treaded attachment cavity;
the treaded attachment cavity being concentrically positioned on the top cover;
the ceiling attachment system comprises a connecting pipe and a treaded ceiling flange;
the treaded ceiling flange being firmly connected with the existing ceiling;
the connecting pipe being removably engaged with the treaded ceiling flange through a first treaded end of the connecting pipe; and
the treaded attachment cavity being removably engaged with the connecting pipe through a second treaded end of the connecting pipe.

14. The laser alignment apparatus as claimed in claim 13 comprises:
the device body being concentrically connected around the connecting tube;
the pre-selected lens being removably attached to the device body opposite from the bearing ring;
the alignment ring being positioned around the device body; and the alignment ring being adjacently positioned with the desired lens.

15. The laser alignment apparatus as claimed in claim 13 comprises:

the switch being adjacently positioned with the laser device.

* * * * *